United States Patent [19]
Bean et al.

[11] Patent Number: 5,837,041
[45] Date of Patent: Nov. 17, 1998

[54] INK CARTRIDGES HAVING INK COMPOSITIONS WITH PIGMENTED PARTICLES AND METHODS FOR THEIR MANUFACTURE AND USE

[75] Inventors: Lloyd F. Bean, London, England; Bing R. Hsieh, Webster; Leonard M. Carreira, Penfield, both of N.Y.

[73] Assignee: Xerox Corporation, Stamford, Conn.

[21] Appl. No.: 843,366

[22] Filed: Apr. 15, 1997

[51] Int. Cl.$^6$ .................................................. C09D 11/00
[52] U.S. Cl. ................ 106/31.6; 106/31.65; 106/31.75; 106/31.76; 106/31.8; 106/31.85; 106/31.88; 106/493
[58] Field of Search ............................... 106/31.6, 31.65, 106/31.75, 31.76, 31.8, 31.85, 31.88, 493

[56] References Cited

U.S. PATENT DOCUMENTS

| | | | |
|---|---|---|---|
| 3,981,735 | 9/1976 | Murata et al. | 106/31.16 |
| 4,833,117 | 5/1989 | Brooks et al. | 503/201 |
| 4,945,156 | 7/1990 | Jenekhe et al. | 528/485 |
| 4,963,616 | 10/1990 | Jenekhe | 524/600 |
| 5,085,698 | 2/1992 | Ma et al. | 524/388 |
| 5,106,417 | 4/1992 | Hauser et al. | 106/493 |
| 5,160,372 | 11/1992 | Matrick | 106/31.43 |
| 5,169,436 | 12/1992 | Matrick | 106/31.58 |
| 5,224,987 | 7/1993 | Matrick | 106/31.43 |
| 5,229,786 | 7/1993 | Suga et al. | 347/100 |
| 5,405,724 | 4/1995 | Hsieh et al. | 430/57 |
| 5,420,625 | 5/1995 | Dietl et al. | 347/85 |
| 5,449,582 | 9/1995 | Hsieh et al. | 430/134 |

OTHER PUBLICATIONS

S. Chang et al., "Preparation and Properties of Tailored Morphology, Monodisperse Colloidal Silica–Cadmium Sulfide Nanocomposites", *J. Am. Chem. Soc.*, 1994, 116, pp. 6739–6744. (No month).

S, Jenekhe et al., Complexation–Mediated Solubilization and Processing of Rigid–Chain and Ladder Polymers in Aprotic Organic Solvents', *Macromolecules*, 1990, 23, pp. 4419–4429. (No month).

*Primary Examiner*—Mark L. Bell
*Assistant Examiner*—Scott L. Hertzog
*Attorney, Agent, or Firm*—Oliff & Berridge, PLC

[57] ABSTRACT

Ink cartridges containing ink compositions containing nanometer scale pigment particles are produced by preparing a pigment solution including a solubilized pigment-Lewis acid complex and an aprotic solvent system, separating the pigment from the pigment solution to form pigmented particles either by precipitating pigment nanoparticles or by dyeing colloidal particles with the solubilized pigment-Lewis acid complex, concentrating the pigmented particles, then dispersing the pigmented particles in a formulating solvent to form an ink composition, and finally introducing the ink composition into an ink cartridge. The ink compositions are particularly suitable for use in ink jet ink cartridges.

16 Claims, No Drawings

INK CARTRIDGES HAVING INK COMPOSITIONS WITH PIGMENTED PARTICLES AND METHODS FOR THEIR MANUFACTURE AND USE

FIELD OF THE INVENTION

This invention is generally directed to ink compositions having ultrafine molecularly dispersed pigments, and the preparation and use of such ink compositions in ink cartridges. More specifically, the present invention is directed to ink cartridges having ink jet ink compositions wherein the ink jet ink compositions are prepared by processes wherein pigmented particles are provided by Lewis acid pigment solubilization and either subsequent precipitation of pigment nanoparticles or subsequent dyeing of colloidal particles with pigment from a solubilized pigment/Lewis acid complex.

BACKGROUND

Ink jet printing is a non-impact method for recording information in response to an electronic signal, such as that generated by a computer. In the printer, the electronic signal produces droplets of ink that are deposited on a substrate such as paper. Ink jet printers have found broad commercial acceptance due to their rapid printing speeds, relatively quiet operation, graphic capability and low cost.

The printed image produced by an ink jet printer, as in most printing processes, consists of discrete dots of at least one ink composition. Both dyes and pigments have been used in ink compositions for ink jet printers.

While satisfactory for many applications, conventional dye based inks are not well-suited for recording high quality images since the dye tends to wick in the paper fibers, causing the dots to have a feathered edge. Thus, the dots do not have the sharp boundaries needed to produce a high resolution image unless special paper is used. Also, the dyes tend to smear after the printing operation due to their high water solubility.

Limitations of dye based inks are particularly apparent when it is desired to record a high quality, multi-colored image. Color selection is limited in that many of the readily available dyes lack color fastness (i.e., the dye tends to fade upon exposure to ultraviolet light) or do not have enough solubility to give the desired chroma. Moreover, the tendency of the printed dots to wick, or bleed together, is an aggravated problem because the printing of a high quality image depends on the formation of small, sharply defined dots of each printing color. While some of the problems associated with dye based inks may be overcome or alleviated to some extent by using special substrates, such as coated paper, there is a need for improved inks for ink jet printing.

Inks compositions comprising pigment dispersions have been suggested in an attempt to avoid the foregoing deficiencies of dye based inks. For example, U.S. Pat. No. 5,085,698 discloses pigmented aqueous inks for ink jet printers, comprising an aqueous carrier medium and particles of pigment stabilized by a block copolymer. U.S. Pat. No. 5,106,417 discloses ink compositions suitable for drop-on-demand ink jet printing containing specified selected amounts of a solid pigment preparation, a water-soluble organic solvent, a humectant and water. U.S. Pat. No. 5,160,372 discloses an ink for ink jet printers which comprises an aqueous carrier medium, pigment dispersion or dye and an amide diol or ester diol cosolvent penetrant. U.S. Pat. No. 5,169,436 discloses ink, jet ink compositions comprising an aqueous carrier medium, a colorant and a sulfoxide or sulfone penetrant. U.S. Pat. No. 5,224,987 discloses ink compositions for ink jet printers comprising an aqueous carrier medium, pigment dispersion or dye and a selected amide or lactam penetrant. U.S. Pat. No. 5,229,786 discloses a recording liquid including a pigment, a water-soluble resin, a water-soluble organic solvent and water, such that the recording liquid is used in an ink-jet recording method.

It has been found, however, that ink compositions comprising pigment particles can have relatively poor storage stability, particularly when the pigment particles are relatively large. Large pigment particles are also known to cause clogging problems for ink ejecting devices, such as ink jet nozzles, of ink cartridges. Moreover, color strength and gloss provided by large pigment particles are inferior to those provided by small pigment particles.

Thus, there has been a desire to produce and use in ink cartridges ink compositions comprising relatively small pigment particles. Conventional means of minimizing the size of pigment particles in inks include attrition and/or grinding steps. For example, U.S. Pat. No. 5,085,698 discloses that a deflocculating (i.e., dispersing) step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. According to this patent, pigment particles of 0.005 to 15 microns (5 to 15,000 nm) can be produced by such conventional methods. Unfortunately, such conventional methods of producing small pigment particles require a large expenditure of energy.

Processes of preparing small pigment particles using Lewis acid solubilization are disclosed in U.S. Pat. No. 5,405,724, where pigment particles are used as photoconductors in a photoreceptor, and in U.S. Pat. No. 5,449,582, where pigment particles are prepared for use in fabricating solution coated photosensitive pigment layers, and photo- and opto-electronic devices. Neither of these patent suggests ink compositions formed by either the precipitation of pigmented particles or the dyeing of colloidal particles with a solubilized pigment/Lewis acid solution.

All references cited herein are incorporated herein by reference in their entireties.

SUMMARY OF THE INVENTION

The invention provides a simple method of efficiently and cost-effectively producing ink cartridges, or ink applicators, comprising ink compositions, the method comprising solubilizing pigments in a polar aprotic solvent through the use of Lewis acids to provide a pigment solution comprising solubilized pigment-Lewis acid complexes, mixing the pigment solution with a pigment separator to separate the pigment from the solubilized pigment/Lewis acid complex in the form of pigmented particles, concentrating the pigmented particles, then dispersing the pigmented particles to form the ink composition, and finally introducing the ink composition into the ink cartridge. Thus, the inventive method provides ink cartridges having ink compositions comprising small pigment particles.

The ink compositions according to the invention have good stability, do not clog ink spraying devices and have excellent color properties. Furthermore, according to the invention, thermal ink jet and acoustic drop-on-demand inks can be prepared. The method of preparing ink compositions is substantially more efficient than conventional methods of preparing pigment based ink compositions, which have relied on energy and time inefficient means of solubilizing pigment particles, such as mechanical grinding of pigments. The inventive method does not appear to be limited to use with any particular type of pigment, but rather appears generally applicable to all color pigments.

Ink compositions according to the invention can be used with a variety of ink applicators, such as ink cartridges, and are particularly adapted for use in printing applications involving, for example, ink jet printers.

DETAILED DESCRIPTION OF PREFERRED EMBODIMENTS

The pigment solubilization process of the invention solubilizes a pigment or mixture of pigments using at least one Lewis acid and at least one solvent. The pigment solubilization process of the invention is analogous in embodiments to the solubilization of heterocyclic ladder and rigid rod polymers by Lewis acids as described, for example, by Jenekhe in U.S. Pat. Nos. 4,945,156 and 4,963,616 and by Jenekhe and Johnson in *Macromolecules*, 23, 4419 (1990) and references cited therein, particularly references 16 to 24 of the *Macromolecules* reference.

The solubilization processing of pigments in accordance with the invention can be comprised of a one or more step process that provides a complexed pigment solution comprised of pigment, a Lewis acid, and a polar aprotic solvent. In a one-step process, pigment complex formation and solubilization take place simultaneously or concurrently. In a two-step process, the first step comprises forming a solid pigment-metalloid complex resulting from any suitable complexation reaction, and the second step comprises solubilization of the solid complex in a suitable organic solvent. A related two-step process is described in U.S. Pat. No. 4,963,616 at column 10, line 4. The resulting solutions obtained from either the one-step or two-step solubilization process contain soluble pigment complexes.

Pigment molecules with electron-rich or electron-donating heteroatoms or pi-electrons readily coordinate with Lewis acid molecules to form pigment-metal complexes that are particularly soluble in polar aprotic solvents. Thus, although the invention is generally applicable to all pigments, pigments such as quinacridones, phthalocyanines, azo and polyazo, squarylium, cyanine pigments, and the like, that are rich in pi-electrons or electron donating heteroatoms, for example, nitrogen, sulfur, oxygen and other Group VA and Group VIA chemical elements in the periodic table, and that are capable of coordinating with certain electron acceptors such as Lewis acids, are particularly suitable for use in the invention. In particular, suitable pigments according to the invention can be selected from the group consisting of metal phtalocyanines, metal-free phthalocyanines, oligomeric phthalocyanines, quinacridones, benzimidazole perylenes, perylene tetracarboxyl diimides, substituted 2,4-diamino-triazines, squaraines, polynuclear aromatic quinones, thiopyrylium compounds and mixtures thereof.

Lewis acids generally are electron acceptors which can combine with a donor molecule or ion by forming a coordinated chemical bond with two electrons from the donor molecule or ion. Other suitable complexing agents include nitrosyl salts, $NO^+A^-$, where A is $BF_4$, $HSO_4$, $PF_6$, $SbCl_6$, $AsF_6$, and the like. The Lewis acids or other complexing agents selected should preferably be soluble in polar aprotic solvents and dissolve, react with or controllably decompose in, protic solvents. In particular, suitable Lewis acids according to the invention include $AlCl_3$, $GaCl_3$, $FeCl_3$, $InCl_3$, $SnCl_4$, $BF_3$, $ZnCl_2$, $TiCl_4$, $SbCl_3$, $SbCl_5$, $CuCl_2$, $SbF_5$, $VCl_4$, $TaCl_5$, $ZrCl_4$, $AsF_3$, and the like, and mixtures thereof. The Lewis acid trifluoroacetic acid may also be used. Preferably, the Lewis acid is aluminum chloride, $AlCl_3$.

An aprotic solvent system can be used for the preparation of the pigment complex solution of the invention. The aprotic solvent system can comprise a polar aprotic solvent or a mixture of polar aprotic solvents. The use of a mixture of about two to about ten solvents can modify the solubilization and primary particle size behaviors of the resultant ultrafine pigment particles. The aggregation behavior of the solubilized pigment may also be influenced by the choice of solvent or solvents used in the solubilization process. A suitable polar aprotic solvent, in embodiments of the invention, can be selected from the group consisting of nitromethane, nitroethane, 1-nitropropane, 1,2-dichloroethane, methylene chloride, benzene, toluene, and the like, and mixtures thereof. Additional useful solvents are disclosed, for example, in U.S. Pat. No. 4,963,616 at column 8, line 54. Any amount of solvent is suitable so long as the pigment solubilization of the present invention is achieved. In a preferred embodiment according to the invention, a polar aprotic solvent system is a mixture of at least one organic solvent and at least one nitro organic solvent selected from the group consisting of methylene chloride, chloroform, trichloroethane, 1,2-dichloroethane, nitroalkanes or nitroalkenes having 1 to 6 carbon atoms, benzene and toluene.

Lewis acid complexed pigment solutions may optionally contain a mixture of two to about ten solubilized pigments for the purpose of preparing a predispersion of ultrafine particulate sized mixed pigments. The predispersion is subsequently formulated into an ink composition according to the invention.

A suitable pigment weight percent in a pigment-complex solution is from about 0.005 to about 20 percent, and preferably from about 1 to about 10 percent. The molar ratio of Lewis acid or Lewis acid molecule mixture to pigment molecules is preferably equal to, or greater than, the number of electron donating elements present in the pigment molecule. In embodiments, the molar ratio of Lewis acid to pigment used in forming Lewis acid-pigment complex solutions ranges from about 1:1 to about 20:1.

Following preparation of a pigment solution comprising a solubilized pigment-Lewis acid complex and a polar aprotic solvent, the pigment solution is mixed with a pigment separator to separate the pigment from the pigment/Lewis acid complex. In embodiments, the pigment separator is a precipitating solution, and the step of mixing the precipitating solution and the pigment solution forms a heterogeneous mixture comprising precipitated pigment particles and polar aprotic solvent containing dissolved Lewis acids. The solubilized pigment complex can be precipitated directly and rapidly into a precipitating solution comprising a protic solvent such as water, or a non-aqueous solvent with the agency of external cooling to control exothermicity which is not the situation in conventional acid pasting processing.

In embodiments, the ultrafine pigmented particles are precipitated from solution by the controlled addition of a precipitating solution comprising a protic solvent. The protic solvent can be a non-solvent or diluent for the aprotic organic solvent used to dissolve the Lewis acid pigment complex. The precipitating solution can contain water, methanol, ethanol, isopropanol, acetic acid and mixtures thereof, in admixture with, for example, formamide, acetone, acetonitrile, dimethyl formamide, N-methyl-2 pyrrolidone and mixtures thereof. Preferably, the precipitating solution can contain protic solvents such as water or methanol, or a mixture thereof.

In embodiments, the precipitating solution can contain pigment dispersants. Preferably, the dispersant is a polymeric dispersant. In addition to, or in place of, a polymeric dispersant, surfactant compounds may be used as dispersants. These may be anionic, cationic, nonionic or amphoteric. A detailed list of non-polymeric as well as some polymer dispersants are listed in the section on dispersants, pages 110–129, 1990 *McCutcheon's Functional Materials*, North American Edition, Manufacturing Confection Publishing Co., Glen Rock, N.J. 07452.

A random sampling and X-ray diffraction analysis of molecularly dispersed pigments prepared by the method of the present invention indicated that no particulate or crystalline bodies greater than about 5 to about 10 nm were detectable. In embodiments, the average primary particle size of the ultrafine pigmented particles was less than about 3 nm to about 5 nm as measured by X-ray diffraction, these particle sizes being smaller than by about two times the sizes obtained by conventional pigmented particle preparation methodologies. The precipitated pigmented particles range in size from about 2 nm to about 10 nm. Preferably, the precipitated pigmented particles range in size from about 2 nm to about 5 nm.

In other embodiments of the invention, the step of mixing a pigment separator with the pigment solution uses colloidal particles as the pigment separator. The colloidal particles are mixed with the pigment solution and dyed with the pigment from the solubilized pigment/Lewis acid complex in the pigment solution. The step of dyeing the colloidal particles in the pigment solution results in a heterogeneous mixture comprising pigmented particles. The colloidal particles serve as carriers or supports for the pigment nanoparticles which result from the colloidal particle dyeing process.

In the practice of the invention, it important that the colloidal particles possess pores of sufficient size to permit penetration by the pigment solution during the colloidal particle dyeing process. In embodiments, swelling of the colloidal particles during immersion in, for example, pigment solution, produces pores of sufficient size to practice the invention.

Both organic and inorganic colloidal particles can be used in embodiments as the carrier particles for the molecular pigment. The particles should be white or light in color or transparent. In addition, the preferred colloidal particles are not soluble in the pigment solution containing the solubilized pigment/Lewis acid complex and aprotic solvent. Organic colloidal particles can be selected from latex particles of polystyrene, polyacrylates, polyvinyl acetate, polymethacrylates and the corresponding copolymers and crosslinked polymers. The surface group of the organic colloidal particles can be sulfates, carboxylates or hydroxy groups. Inorganic particles can be selected from metal oxides such as silica, alumina, tin oxide, and titanium oxide. Inorganic particles can also be selected from cadmium selenide and cadmium sulfide. Inorganic particles can also be silica-cadmium sulfide particles, such as those disclosed in *J. Am. Chem. Soc.*, 1994, 116, 6739–6744. This article is incorporated herein by reference.

The colloidal particles have a particle size of between about 50 nanometers and about 5.0 microns. Preferably, the colloidal particles have a particle size of between about 100 nanometers and about 1.0 micron.

Following the mixing of a pigment separator with the pigment solution to form a heterogeneous mixture compris-ing pigmented particles, the pigmented particles are concentrated to form a concentration of pigmented particles. In embodiments, the step of concentrating the pigmented particles involves first dialyzing the heterogeneous mixture containing pigmented particles to separate and concentrate the pigmented particles. Preferably, the separated pigmented particles are essentially free of the Lewis acid. Lewis acid can be removed from the concentration of separated pigmented particles by washing with protic solvents as described below. The separated pigmented particles are then dispersed by dilution with at least one formulating solvent to form an ink composition.

In other embodiments, the step of concentrating the pigmented particles involves first isolating the pigmented particles in a concentration of pigmented particles known as a "pigmented wet cake" (alternatively, "water wet presscake"). The pigmented particle isolation is accomplished by separating solvent from the pigmented particles of the heterogeneous mixture by means such as centrifugation, filtration, sedimentation or evaporation. In wet cake form, the pigmented particles are not aggregated to the extent that they are in dry form. Thus, pigmented particles in wet cake form do not require as much deaggregation in the process of preparing ink as do pigmented particles in dry form. A pigment wet cake has a very long shelf life as long as it is kept wet.

According to the invention, preferably the concentration of pigmented particles in the pigmented wet cake and in the dialyzed concentration of pigmented particles, described above, is essentially free of Lewis acids. Lewis acids can be removed from the pigmented wet cake by washing the pigmented wet cake with the protic solvents that can comprise the precipitating solution. These protic solvents effectively neutralize the Lewis acid, by decomposing, dissolving and subsequently selectively removing substantial amounts of the Lewis acid component from the pigmented particles. Extensive washing of pigmented wet cake, made according to the present invention, resulted in pigmented wet cake in which only trace amounts of Lewis acid species were measurable by energy dispersive X-ray analysis and related spectroscopic means. When the pigmented wet cake is not washed and neutralized prior to being dispersed in aqueous and organic solvents to form ink compositions, the level of residual Lewis acid species or ions in the ink formulations is considerably higher.

To form an ink composition, the concentration of pigmented particles in the pigmented wet cake are dispersed in a formulating solvent. A pigmented wet cake prepared according to the invention can be flushed into any liquid solvent to form "instant" fine pigment dispersions and ink compositions.

In general, the formulating solvent according to the present invention can be any organic based liquid media or solvent, or any aqueous based liquid media or solvent, which does not hinder the dispersion of pigment particles mixed in it. In embodiments, the formulating solvent can be water, ethylene glycol, and mixtures thereof. In preferred embodiments, the formulating solvent contains at least one pigment dispersant.

In embodiments of the invention, surfactants can be added to the formulating solvent. Surfactants can alter surface tension as well as maximize penetration. Surfactants that improve the stability of the ink compositions of the present invention can be non-ionic, cationic, anionic or amphoteric surfactants. Nonionic surfactants include those polyethylene oxide compounds and polymers and polypropylene oxide compounds and polymers, such as polyethylene 400 distearate and copolymers of polyethylene oxide and polypropylene oxide. Examples of cationic surfactants include stearyl ammonium chloride and cetyltrimethylammonium bromide. Examples of anionic surfactant include sodium stearate and sodium lauryl sulfate. Examples of amphoteric surfactants include oleyl amino-oleate and Miranol CM. Additional surfactants are disclosed in "Surfactant Science Series", M. J. Schick and F. M. Fowkes, editors, volumes 1–25, published by Marcel Dekker, Inc., of New York, the contents of which are incorporated herein by reference.

The ink compositions prepared according to the invention may contain various known additives, including biocides to inhibit the growth of microorganisms, and sequestering agents such as EDTA to eliminate deleterious effects of heavy metal impurities. Other known additives, such as humectants, viscosity modifiers and other acrylic or non-acrylic polymers may also be added to improve various properties of the ink compositions.

After dispersing the concentration of pigmented particles in a formulating solvent to form an ink composition, the ink composition is introduced into an ink cartridge or applicator to complete a method of manufacture of an ink cartridge according to the invention. The ink cartridge or applicator comprises a reservoir to contain the ink composition, and a means for removing the ink composition during a printing process. The means for removing the ink composition can be an ink ejecting or spraying device, such as an ink jet nozzle.

Another method of manufacture of an ink cartridge according to the invention comprises introducing the ink composition of the invention into an applicator such as the ink supply system of U.S. Pat. No. 5,420,625. This reference is incorporated herein in its entirety.

According to the invention, an ink cartridge is provided. The ink cartridge is manufactured according to the methods described above.

According to the invention, a method of printing is provided. In the method of printing, the ink cartridge of the invention is used to print. In embodiments, the method of printing involves ejecting or spraying an ink composition comprising pigmented particles from the ink cartridge. In preferred embodiments, the method of printing is carried out using ink jet printers.

EXAMPLES

The invention will be illustrated in more detail with reference to the following Examples, but it should be understood that the present invention is not deemed to be limited thereto.

Example 1

Solubilized pigment/aluminum chloride complex solutions are prepared by stirring a mixture of a pigment, aluminum chloride ($AlCl_3$) and nitromethane or a mixed solvent of nitromethane or methylene chloride. The solutions are capped in 20 ml vials in a glove box under nitrogen atmosphere for 12 to 16 hours at room temperature. A set of pigment solutions with certain compositions is summarized in Table 1. The molar ratio of the pigment to $AlCl_3$ is 1:6 in all situations. These solutions have about 2 weight percent of pigment and are easily passed through 0.45 micrometer filters.

TABLE 1

| pigments & reagents | soln. 1 | soln. 2 | soln. 3 | soln. 4 | soln. 5 | soln. 6 |
|---|---|---|---|---|---|---|
| TiOPc | 0.26 | — | — | — | — | — |
| VOPc | — | 0.26 | — | — | — | — |
| PV Fast Blue (grams) | — | — | 0.29 | — | — | — |
| Permanent Yellow (grams) | — | — | — | 0.30 | — | — |
| Hostaperm Pink E (grams) | — | — | — | — | 0.17 | — |
| benzimidazole perylene (grams) | — | — | — | — | — | 0.26 |
| $AlCl_3$ (grams) | 0.39 | 0.39 | 0.39 | 0.39 | 0.39 | 0.39 |
| nitromethane (mL) | 8 | 8 | 10 | 10 | 10 | 8 |
| methylene chloride (mL) | 2 | 2 | — | — | — | 2 |

Example 2

Solution 5 of Table 1 is poured into a homogenizing (8000 rpm) aqueous surfactant solution (40 ml) comprising 2 wt % polyethylene glycol (MW 10,000–25,000). Homogenization is continued for 1 minute. The resulting mixture is centrifuged at 5000 rpm for 15 minutes. The aqueous layer is decanted to give a pigment wet cake. To this is added ethylene glycol to give an ink with a total weight of 5 grams.

Example 3

Solution 5 of Table 1 is poured into a homogenizing (8000 rpm) aqueous surfactant solution (40 ml) comprising 2 wt % polyethylene glycol (MW 10,000–25,000). Homogenization is continued for 1 minute. The resulting mixture is centrifuged at 5000 rpm for 15 minutes. The aqueous layer is decanted to give a pigment wet cake. To this is added ethylene glycol/ethanol (70/30 wt ratio) to give an ink with total weight of 5 grams.

Example 4

The following procedure is performed under nitrogen atmosphere. Into solution 4 of Table 1 is added dried titanium oxide particles (1 gram) in nitromethane (5 ml). The resulting mixture is stirred at room temperature for 8 hours and then centrifuged. The solution is decanted and nitromethane (10 ml) is added. The resulting mixture is stirred for 2 hours and then centrifuged. The solution is decanted to give a wet cake of colored titanium dioxide. To this is added ethylene glycol to give an ink with a total weight of 8 grams.

While the invention has been described in detail and with reference to specific examples thereof, it will be apparent to one skilled in the art that various changes and modifications can be made therein without departing from the spirit and scope thereof.

What is claimed is:

1. A method comprising:
   providing a pigment solution comprising
      a solubilized pigment-Lewis acid complex and
      an aprotic solvent system;
   mixing a pigment separator with the pigment solution to form a heterogeneous mixture comprising pigmented particles;

concentrating the pigmented particles of the heterogeneous mixture to form a concentration of pigmented particles;

dispersing the concentration of pigmented particles in a formulating solvent to form an ink composition; and introducing the ink composition into an ink cartridge.

2. The method according to claim 1, wherein the solubilized pigment-Lewis acid complex comprises a pigment selected from the group consisting of metal phthalocyanines, metal-free phthalocyanines, oligomeric phthalocyanines, quinacridones, benzimidazole perylenes, perylene tetracarboxyl diimides, substituted 2,4-diamino-triazines, squaraines, polynuclear aromatic quinones, thiopyrylium compounds, and mixtures thereof.

3. The method according to claim 1, wherein the solubilized pigment-Lewis acid complex comprises a Lewis acid selected from the group consisting of $AlCl_3$, $GaCl_3$, $FeCl_3$, $InCl_3$, $SnCl_4$, $BF_3$, $ZnCl_2$, $TiCl_4$, $SbCl_3$, $SbCl_5$, $CuCl_2$, $SbF_5$, $VCl_4$, $TaCl_5$, $ZrCl_4$, $AsF_3$, and mixtures thereof.

4. The method according to claim 1, wherein the aprotic solvent system is a mixture of at least one non-nitro organic solvent and at least one nitro organic solvent selected from the group consisting of methylene chloride, chloroform, trichloroethane, 1,2-dichloroethane, nitroalkanes or nitroalkenes having 1 to 6 carbon atoms, benzene and toluene.

5. The method according to claim 1, wherein the step of mixing a pigment separator comprises mixing a precipitating solution with the pigment solution.

6. The method according to claim 5, wherein the precipitating solution comprises at least one pigment dispersant.

7. The method according to claim 5, wherein the precipitating solution comprises a protic solvent.

8. The method according to claim 7, wherein the protic solvent comprises water or methanol.

9. The method according to claim 1, wherein the step of mixing a pigment separator comprises dyeing colloidal particles with the solubilized pigment-Lewis acid complex to form the pigmented particles.

10. The method according to claim 1, wherein the step of concentrating the pigmented particles comprises a step of dialysis.

11. The method according to claim 1, wherein the step of concentrating the pigmented particles comprises a further step of centrifugation, filtration, sedimentation or evaporation, and the further step forms a pigmented wet cake comprising pigmented particles.

12. The method according to claim 1, wherein the step of concentrating the pigmented particles comprises a further step of washing the concentration of pigmented particles to remove Lewis acid.

13. The method according to claim 1, wherein the formulating solvent comprises an organic based media or an aqueous based media.

14. The method according to claim 13, wherein the formulating solvent further comprises a surfactant.

15. An ink cartridge, made by a method of manufacturing comprising:

providing a pigment solution comprising
a solubilized pigment-Lewis acid complex and
an aprotic solvent system;

mixing a pigment separator with the pigment solution to form a heterogeneous mixture comprising pigmented particles;

concentrating the pigmented particles of the heterogeneous mixture to form a concentration of pigmented particles;

dispersing the concentration of pigmented particles in a formulating solvent to form an ink composition; and introducing the ink composition into the ink cartridge.

16. A method of printing, comprising ejecting an ink composition from an ink jet cartridge, said ink jet cartridge being manufactured by a method comprising:

providing a pigment solution comprising
a solubilized pigment-Lewis acid complex and
an aprotic solvent system;

mixing a pigment separator with the pigment; solution to form a heterogeneous mixture comprising pigmented particles;

concentrating the pigmented particles of the heterogeneous mixture to form a concentration of pigmented particles;

dispersing the concentration of pigmented particles in a formulating solvent to form the ink composition; and introducing the ink composition into the ink cartridge.

* * * * *